United States Patent [19]

Wang

[11] Patent Number: 5,035,063

[45] Date of Patent: Jul. 30, 1991

[54] RULER FOR MEASURING SHAPE

[76] Inventor: Shu F. Wang, 9-1, Lane 161, Hsing An Road Sec. 1, Taichung, Taiwan

[21] Appl. No.: 593,951

[22] Filed: Oct. 9, 1990

[51] Int. Cl.[5] .............................................. G01B 5/20
[52] U.S. Cl. ................................................... 33/561.1
[58] Field of Search ........................................ 33/561.1

[56] References Cited

U.S. PATENT DOCUMENTS

| | | | |
|---|---|---|---|
| 2,022,628 | 11/1935 | Whitney | 33/561.1 |
| 2,615,256 | 10/1952 | Olson | 33/561.1 |
| 4,700,487 | 10/1987 | Bogle | 33/561.1 |

Primary Examiner—Harry N. Haroian

[57] ABSTRACT

A ruler for measuring shape comprises a measuring frame, an inset frame, two metal plates, another measuring frame and a plurality of sliding rods. The measuring frame has an upper flap and a lower flap integrating with the upper and lower edges of an end flap to define a slot and an open end portion. An elongated slot is formed at the mid-section of the end flap for permitting an inset slab being secured thereto. The upper and lower flaps have two mortise recesses and two screw holes respectively formed on their edges opposite from the end flap. The inset frame has two mortise recesses corresponding to the mortise recesses of the upper and lower flaps and two screw holes. Two metal plates which are of an identical size for the insertion to the mortise recesses of the upper and lower flaps and of the inset frame have two screw holes formed thereon respectively for the connection of the measuring frame and the inset frame. A plurality of sliding rods have two butts formed at both ends thereof for making contact with an object to be measured, a rod body having a horizontally extended rectangular slot for the inset slab being disposed therewithin.

2 Claims, 4 Drawing Sheets

RULER FOR MEASURING SHAPE

BACKGROUND OF THE PRESENT INVENTION

The present invention relates to a ruler, more particularly to a ruler is of an integral structure for measuring shape of an object.

The structure of a conventional shape-measuring ruler is often defectively designed and constructed and in such a way that its component parts are prone to fall apart by accident. In addition, a conventional shape-measuring ruler is not equipped to permit a precise measurement of the shape of an object.

Referring to FIG. 1, a conventional shape-measuring ruler mainly comprises a frame 1, an inlet piece 2, and a plurality of sliding rods 3. The conjugation of the frame 1 and the inlet piece 2 is completed by means of the tenon parts 101 and 201 and the mortise recesses 102 and 202. However, the tenon parts 101 and 201 are vulnerable to breakage after a prolonged and repeated usage. Moreover, the displacement of a sliding rod 3 is inevitable when the process of measuring the shape of an object is under this way, bringing about an inaccurate shape measurement of an object.

Therefore, the primary object of the present invention is to provide a ruler with enhanced integral structures for measuring shape in a precise manner.

SUMMARY OF THE PRESENT INVENTION

A ruler for measuring shape comprises a measuring frame, an inset frame, two metal plates, and a plurality of sliding rods. A frame of a U-shaped rectangular structure has an upper flap, a lower flap, an end flap, and an open end portion. An inset slab of an appropriate width is braced securely to the end flap and disposed in the mid-section of an elongated slot located between the upper flap and the lower flap to form an upper space and a lower space. Located at the open end portion of the upper flap and the lower are mortise recesses. There are screw holes disposed at the locations near the open end portion of the upper flap and the lower flap. An inset frame of a rectangular structure has mortise recesses of an identical size disposed on the side thereof facing the open end portion of the measuring frame and has screw holes disposed therethrough. Each of two metal plates has two screw holes disposed thereon respectively for serving to connect the measuring frame and the inset frame together. A plurality of sliding rods of an appropriate length with butts disposed at both ends thereof are for making contact with an object to be measured. An inset slab is disposed into the rod body of the sliding rod at the position corresponding to that of the slot of the measuring frame for permitting the sliding rods horizontally sliding along the slot. Thereby, a ruler for measuring shape, with a combination of a measuring frame and an inset frame or a combination of a measuring frame and another measuring frame, provides a means for measuring the shape of an object in a precise manner by means of an application of sliding rods thereof to make contact with the object intended to be measured.

DETAILED DESCRIPTION OF THE PRESENT INVENTION

Figure 1:
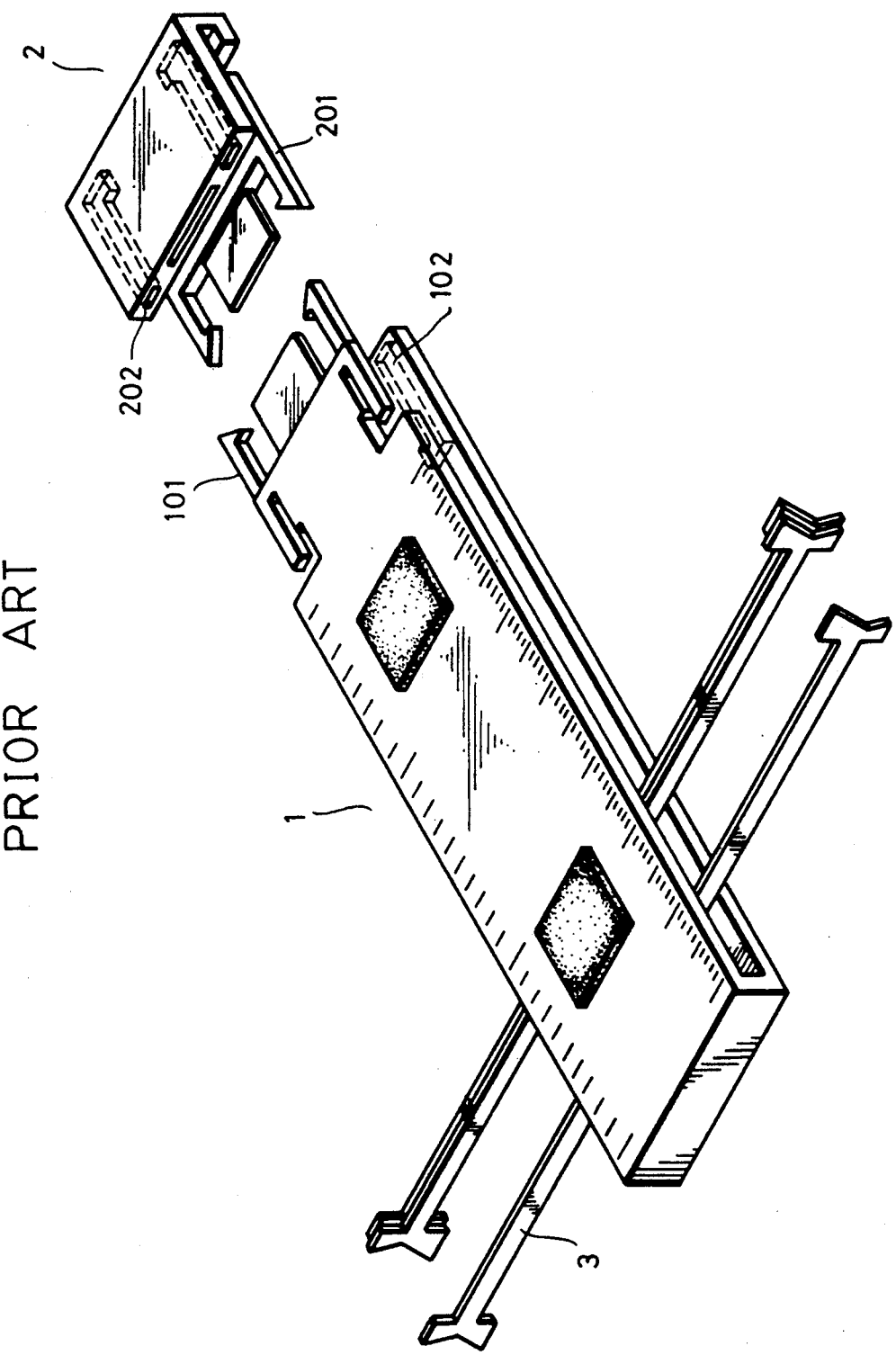
FIG. 1 is a disassembled view of a prior art.
Figure 2:
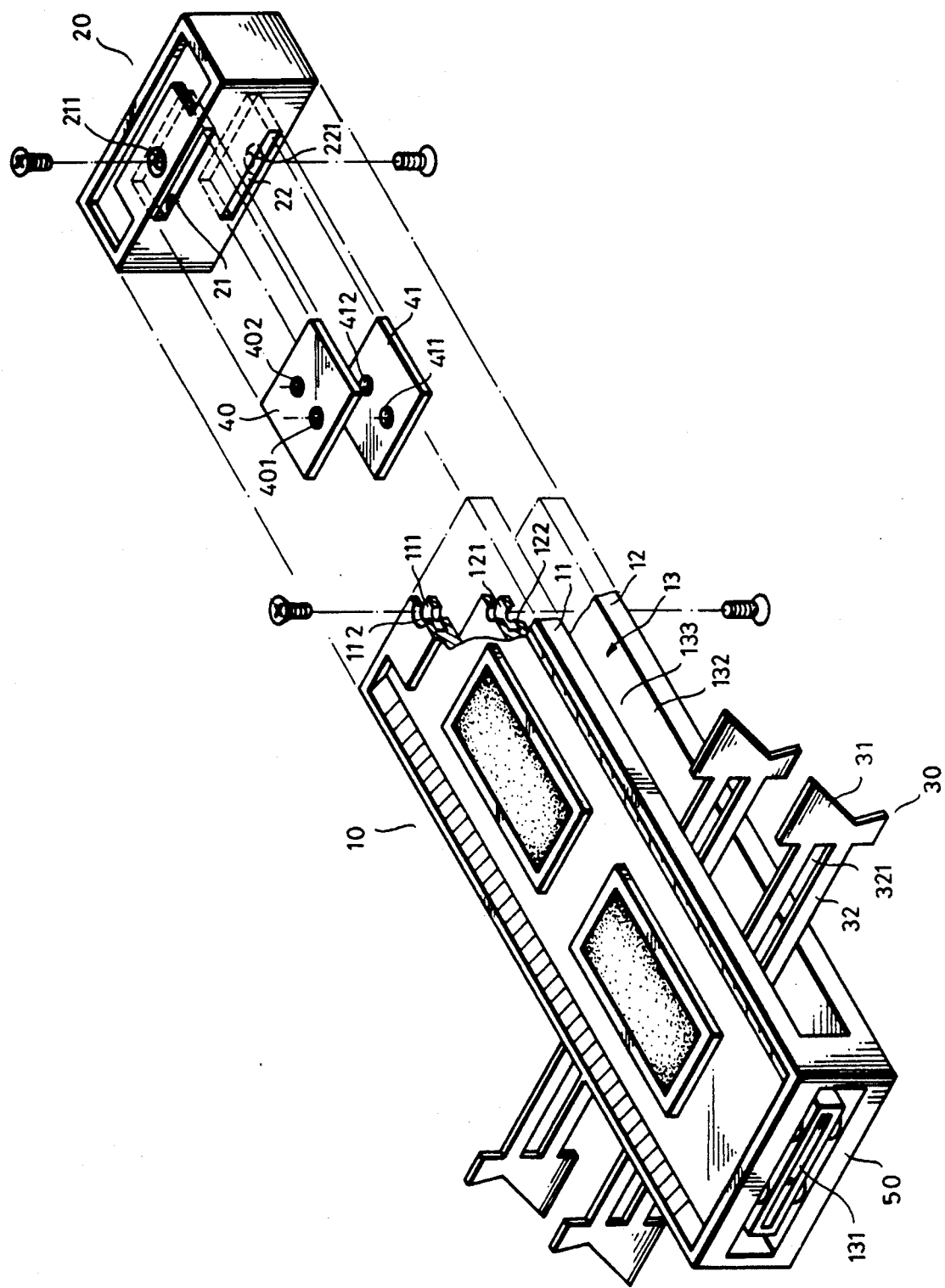
FIG. 2 is a disassembled, partly cross-sectional view of the embodiment which embodies the concepts of the present invention.
Figure 3:
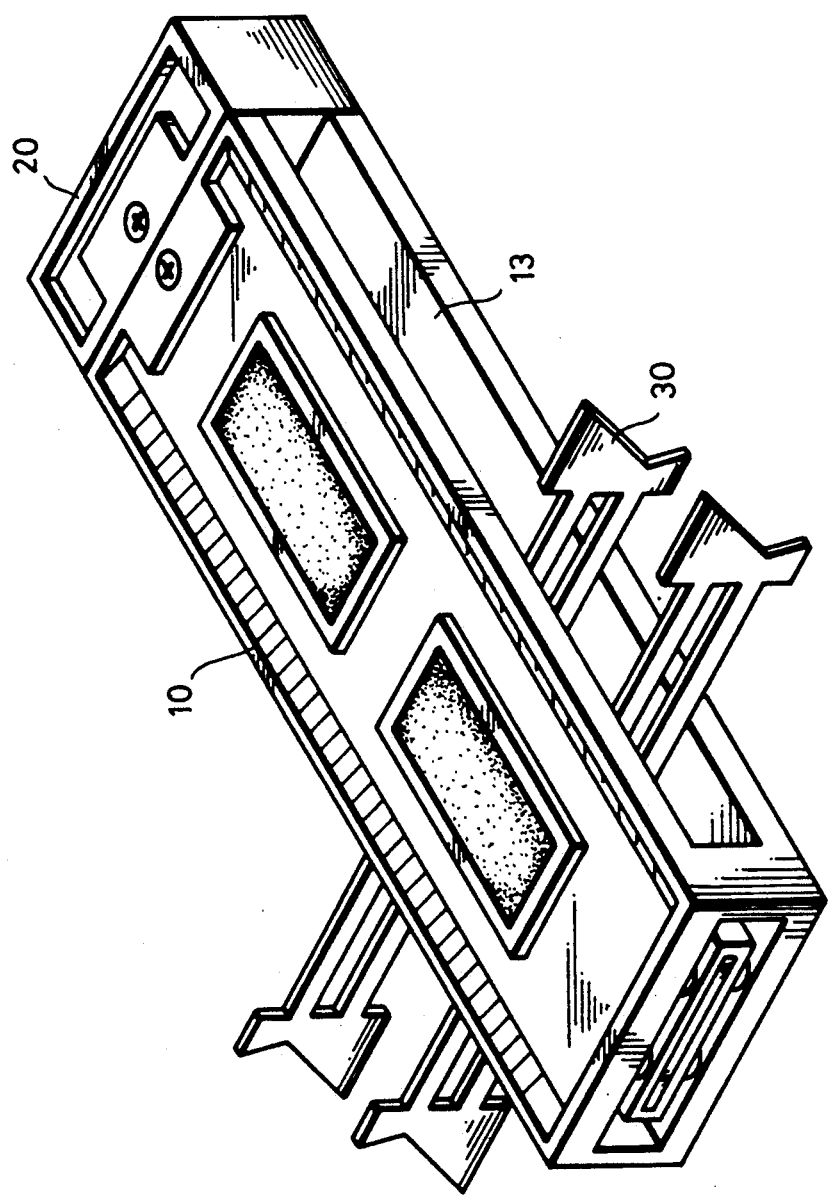
FIG. 3 is a perspective view showing the assembly of the embodiment which embodies the concepts of the present invention.

Referring to FIG. 2, a ruler for measuring shape comprises a measuring frame 10, an inset frame, 20, a plurality of sliding rods 30, and two metal plates 40 and 41.

The measuring frame 10 has an upper flap 11, a lower flap 12, and an end flap 50. The upper flap 11 and lower flap 12, rectangular in shape and parallel to each other, are perpendicularly integral with the upper and lower ends of the end flap 50 respectively. A slot 13 and an open end portion 60 are defined by the upper, lower and end flaps 11, 12 and 50 of the measuring frame 10. An inset slab 131 of an appropriate width is braced securely to the end flap 50 and is disposed in the mid-section of an elongated slot 13 located on the end flap 50 between the upper flap 11 and the lower flap 12. By means of the positioning of the inset slab 131, the slot 13 are separated as an upper space 132 and a lower space 133 for confining the positionings of the metal plates 40 and 41. Two rectangular mortise recesses 111 and 121 are formed on the edges of the upper flap 11 and the lower flap 12 adjacent to the open end portion 60 respectively. Two screw holes 112 and 122 are respectively formed on the middle edges of the upper and lower flaps 11 and 12 which are opposite from the end flap 50. The screw holes 112 and 122 are for the connection of the frame 10 and the inset frame 20.

The inset frame 20, rectangular in shape, has two mortise recesses 21 and 22 of an identical size disposed on the side thereof facing the open end portion 60 and has two screw holes 211 and 221 disposed thereon for the connection of the measuring frame 10 and the inset frame 20.

Figure 4:
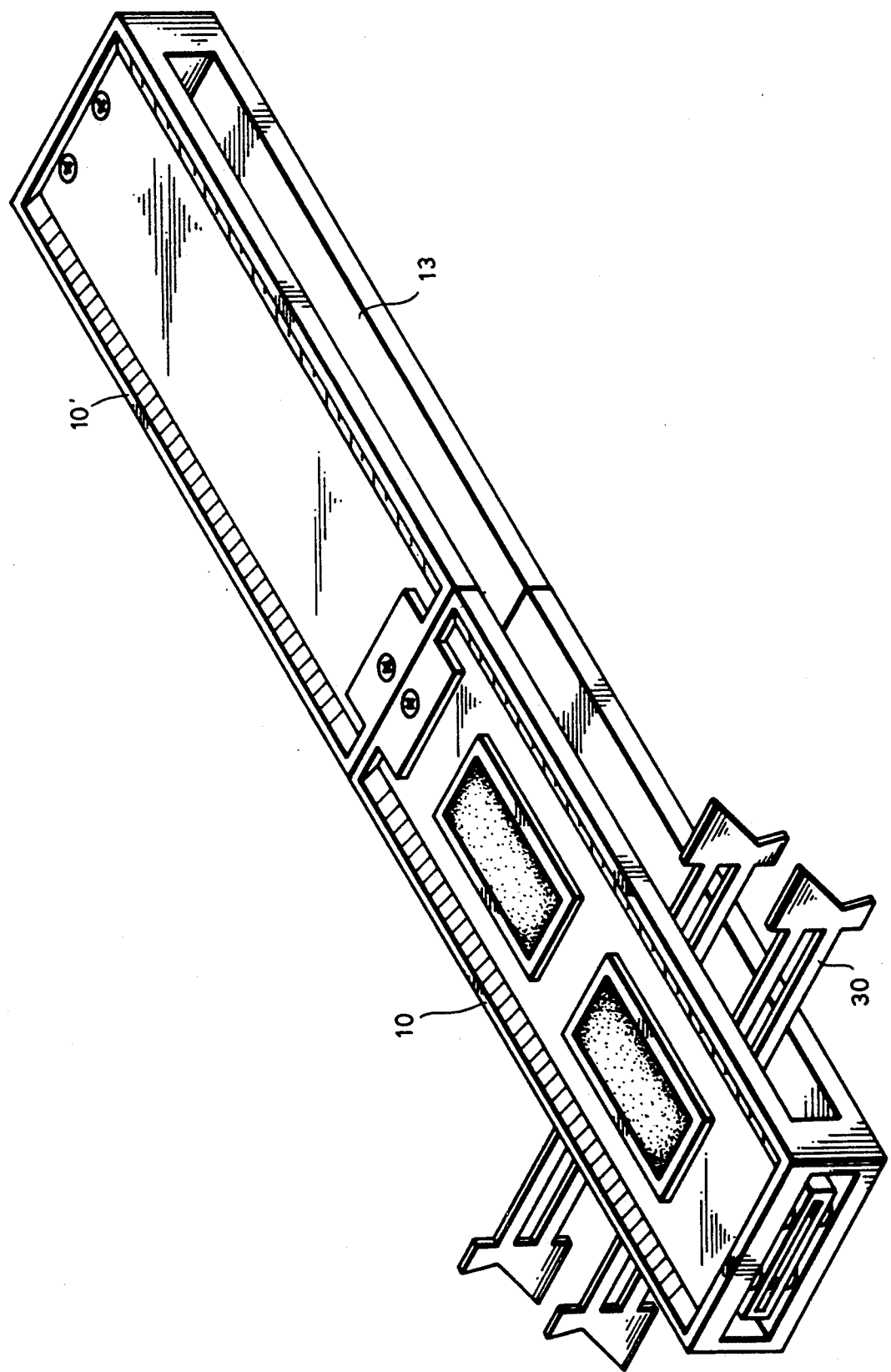
FIG. 4 is a perspective view of an embodiment which embodies the concepts of the present invention but in the alternative arrangement.

The elongated and rectangular sliding rods 30 of an appropriate length having butts 31 formed at both ends thereof serving as stoppers. Located at the position corresponding to that of the slot 13 of the measuring frame 10 is a horizontally extended rectangular hole 321 disposed in the rod body 32 of the sliding rod 30 through which the inset slab 131 is inserted. By this means, the sliding rods 30 are horizontally slidable along the slot 13.

each of the metal plates 40 and 41 has screw holes 401 and 402, 411 and 412 respectively, which in conjunction with screw holes 112 and 211, 122 and 221 serve to fasten the measuring frame 10 and the inset frame 20 together by means of bolts. Whenever the measurement of an object of a large volume is desired, the inset frame 20 is slidably detached from the measuring frame 10 and replaced with another measuring frame 10', as shown in FIG. 4. The structure of another measuring frame 10' is similar to that of the inset frame 20 but in an elongate manner. The lift of the shape-measuring ruler embodied in the present invention is therefore prolonged thanks to the resistant quality of breakage of the metal plate 40 and 41 which are characterized by a greater rigidity.

In addition, the inset slab 131 serves to ensure that the movement of the sliding rod 30 does not induce the displacement of an adjacent sliding rod 30 when the measurement of the shape of an object is under way.

Thus, the efficacy of a ruler for measuring shape embodied in the present invention is greatly enhanced by the merit that the shape measurement of an object can be achieved in a precise manner.

The embodiment of the present invention described above is to be considered in all respects as merely illustrative of principles of the present invention. Accordingly, the present invention is to be ranged by the scope of the appended claims hereinafter.

I claim:

1. A ruler for measuring shape comprising:

a measuring frame having an upper flap, a lower flap and an end flap thereof; said upper flap and lower flap, rectangular in shape and parallel to each other, being integral with the upper and lower edges of said end flap respectively to define a slot and an open end portion; an insert slab of an appropriate width being braced securely to said end flap disposed in an elongated slot which is formed on the mid-section of said end flap to separate said slot as an upper space and a lower space; two mortise recesses being respectively formed on the edges of said upper flap and lower flap, opposite from said end flap; adjacent to said open end portion, said upper and lower flap having at least one screw hole formed thereon;

an insert frame, rectangular in shape, having two mortise recesses of an identical size disposed on one side facing said open end portion and corresponding to the motise recesses in, said upper and lower flaps respectively, and said insert frame having two screw holes formed thereon corresponding to said screw holes on said upper and lower flaps;

two metal plates, each having two srew holes disposed thereon respectively, being for insertion to said mortise recesses of said upper and lower flaps to said mortise recesses of said insert frame to ensure the connection of said frame and said inset frame; and a plurality of elongated sliding rods of an appropriate length, each said sliding rod having butts serving as stoppers disposed at both ends of a rod body, each said rod body having a horizontally extending rectangular slot formed therein; said horizontally extended rectangular slots receiving said inset slab therein and horizontally sliding thereon; whereby, a ruler for measuring shape, with a combination of said measuring frame and said inlet frame for measuring the shape of an object in a precise manner by means of an application of said sliding rods to make contact with the object to be measured.

2. A ruler for measuring shape according to claim 1, wherein said inset frame can be replaced by another measuring frame having connection structure similar to the inset frame end structure for attachment to the first measuring frame for measuring the shape of an object of a larger volume in a precise manner by means of an application of said sliding rods to make contact with the object to be measured.

* * * * *